United States Patent
Gonzalez et al.

(10) Patent No.: US 7,581,081 B2
(45) Date of Patent: Aug. 25, 2009

(54) SYSTEMS AND METHODS FOR SOFTWARE EXTENSIBLE MULTI-PROCESSING

(75) Inventors: Ricardo E. Gonzalez, Redwood City, CA (US); Albert R. Wang, Los Altos, CA (US); Gareld Howard Banta, Atherton, CA (US)

(73) Assignee: Stretch, Inc., Sunnyvale, CA (US)

( * ) Notice: Subject to any disclaimer, the term of this patent is extended or adjusted under 35 U.S.C. 154(b) by 263 days.

(21) Appl. No.: 10/750,714

(22) Filed: Dec. 31, 2003

(65) Prior Publication Data

US 2004/0250046 A1    Dec. 9, 2004

Related U.S. Application Data

(60) Provisional application No. 60/459,538, filed on Mar. 31, 2003.

(51) Int. Cl.
    G06F 15/76    (2006.01)
(52) U.S. Cl. .............................. 712/28; 712/11; 709/213
(58) Field of Classification Search .................. 712/28, 712/11; 709/213
    See application file for complete search history.

(56) References Cited

U.S. PATENT DOCUMENTS

| | | | |
|---|---|---|---|
| 4,635,261 A | 1/1987 | Anderson |
| 4,766,569 A | 8/1988 | Turner |
| 4,783,738 A | 11/1988 | Li |
| 4,893,311 A | 1/1990 | Hunter |
| 5,055,997 A | 10/1991 | Sluijter |
| 5,247,689 A | 9/1993 | Ewert |
| 5,258,668 A | 11/1993 | Cliff |
| 5,260,610 A | 11/1993 | Pedersen |
| 5,260,611 A | 11/1993 | Cliff |
| 5,274,581 A | 12/1993 | Cliff |
| 5,274,782 A | 12/1993 | Chalasani |
| 5,293,489 A | 3/1994 | Furui et al. |
| 5,299,317 A | 3/1994 | Chen |
| 5,343,406 A | 8/1994 | Freeman |
| 5,357,152 A | 10/1994 | Jennings, III |
| 5,361,373 A | 11/1994 | Gilson |
| 5,414,377 A | 5/1995 | Freidin |
| 5,426,378 A | 6/1995 | Ong |
| 5,436,574 A | 7/1995 | Veenstra |

(Continued)

FOREIGN PATENT DOCUMENTS

EP    0 507 507    7/1992

(Continued)

OTHER PUBLICATIONS

"CRISP: A Template for Reconfigurable Instruction Set Processors"; Beeck et al.; 2001.*

(Continued)

*Primary Examiner*—Alford W Kindred
*Assistant Examiner*—Benjamin P Geib
(74) *Attorney, Agent, or Firm*—Carr & Ferrell LLP

(57) ABSTRACT

A system for processing applications includes processor nodes and links interconnecting the processor nodes. Each node includes a processing element, a software extensible device, and a communication interface. The processing element executes at least one of the applications. The software extensible device provides additional instructions to a set of standard instructions for the processing element. The communication interface communicates with other processor nodes.

32 Claims, 14 Drawing Sheets

U.S. PATENT DOCUMENTS

| | | | |
|---|---|---|---|
| 5,471,628 | A | 11/1995 | Phillips |
| 5,488,612 | A | 1/1996 | Heybruck |
| 5,517,627 | A | 5/1996 | Petersen |
| 5,535,406 | A * | 7/1996 | Kolchinsky .................. 712/10 |
| 5,619,665 | A | 4/1997 | Emma |
| 5,636,224 | A | 6/1997 | Voith |
| 5,652,875 | A | 7/1997 | Taylor |
| 5,682,493 | A | 10/1997 | Yung |
| 5,684,980 | A | 11/1997 | Casselman |
| 5,696,956 | A | 12/1997 | Razdan |
| 5,726,584 | A | 3/1998 | Freidin |
| 5,742,180 | A | 4/1998 | DeHon |
| 5,784,636 | A | 7/1998 | Rupp |
| 5,794,062 | A | 8/1998 | Baxter |
| 5,819,064 | A | 10/1998 | Razdan |
| 5,822,588 | A | 10/1998 | Sterling |
| 5,828,835 | A | 10/1998 | Isfeld |
| 5,847,578 | A * | 12/1998 | Noakes et al. ................. 326/39 |
| 5,850,564 | A | 12/1998 | Ting |
| 5,920,202 | A | 7/1999 | Young |
| 5,926,036 | A | 7/1999 | Cliff |
| 5,943,150 | A | 8/1999 | Deri |
| 5,956,518 | A * | 9/1999 | DeHon et al. ................. 712/15 |
| 5,963,050 | A | 10/1999 | Young |
| 5,977,793 | A | 11/1999 | Reddy |
| 5,982,195 | A | 11/1999 | Cliff |
| 5,986,465 | A | 11/1999 | Mendel |
| 5,999,734 | A * | 12/1999 | Willis et al. ................. 717/149 |
| 6,026,478 | A | 2/2000 | Dowling |
| 6,092,174 | A * | 7/2000 | Roussakov .................. 712/15 |
| 6,167,502 | A | 12/2000 | Pechanek |
| 6,219,628 | B1 | 4/2001 | Kodosky |
| 6,237,079 | B1 | 5/2001 | Stoney |
| 6,292,388 | B1 | 9/2001 | Camarota |
| 6,343,337 | B1 | 1/2002 | Dubey |
| 6,353,841 | B1 | 3/2002 | Marshall |
| 6,374,403 | B1 | 4/2002 | Darte |
| 6,415,424 | B1 * | 7/2002 | Arimilli et al. ................. 716/8 |
| 6,418,045 | B2 | 7/2002 | Camarota |
| 6,426,648 | B1 | 7/2002 | Rupp |
| 6,467,009 | B1 | 10/2002 | Winegarden |
| 6,505,241 | B2 | 1/2003 | Pitts |
| 6,557,092 | B1 | 4/2003 | Callen |
| 6,622,233 | B1 * | 9/2003 | Gilson ......................... 712/11 |
| 6,633,181 | B1 | 10/2003 | Rupp |
| 6,698,015 | B1 | 2/2004 | Moberg |
| 6,721,866 | B2 | 4/2004 | Roussel |
| 6,721,884 | B1 | 4/2004 | De Oliveira Kastrup Pereira |
| 6,732,354 | B2 | 5/2004 | Ebeling |
| 6,744,274 | B1 | 6/2004 | Arnold |
| 6,795,900 | B1 | 9/2004 | Miller |
| 6,799,236 | B1 | 9/2004 | Dice |
| 6,817,013 | B2 | 11/2004 | Tabata |
| 6,831,690 | B1 | 12/2004 | John |
| 6,857,110 | B1 | 2/2005 | Rupp |
| 6,874,110 | B1 | 3/2005 | Camarota |
| 6,883,084 | B1 | 4/2005 | Donohoe |
| 6,954,845 | B2 | 10/2005 | Arnold |
| 6,963,962 | B2 | 11/2005 | Ramagopal |
| 6,968,544 | B1 | 11/2005 | Schneider |
| 6,986,127 | B1 | 1/2006 | Newlin |
| 6,996,709 | B2 | 2/2006 | Arnold |
| 7,000,211 | B2 | 2/2006 | Arnold |
| 7,007,155 | B2 | 2/2006 | Mohebbi |
| 7,062,520 | B2 | 6/2006 | Rupp |
| 7,086,047 | B1 | 8/2006 | Edwards |
| 7,178,062 | B1 | 2/2007 | Dice |
| 7,254,142 | B2 | 8/2007 | Hagsand |
| 7,269,616 | B2 | 9/2007 | Rupp |
| 7,350,054 | B2 | 3/2008 | Furuta |
| 7,373,642 | B2 | 5/2008 | Williams |
| 7,412,684 | B2 | 8/2008 | Gutberlet |
| 2003/0097546 | A1 | 5/2003 | Taylor |
| 2004/0019765 | A1 * | 1/2004 | Klein ......................... 712/15 |
| 2004/0193852 | A1 | 9/2004 | Johnson |
| 2004/0208602 | A1 | 10/2004 | Plante |
| 2005/0166038 | A1 | 7/2005 | Wang et al. |

FOREIGN PATENT DOCUMENTS

| | | |
|---|---|---|
| EP | 0 668 659 | 8/1995 |
| EP | 1 443 417 | 8/2004 |
| TW | 152355 | 7/2002 |
| TW | 152994 | 7/2002 |
| TW | 168210 | 4/2003 |

OTHER PUBLICATIONS

"A Virtual Bus Architecture for Dynamic Parallel Processing"; K. C. Lee; 1993; IEEE.*

"iWarp: An Intergrated Solution to High-Speed Parallel Computing"; Borkar et al.; 1988; IEEE.*

"Reconfigurable Instruction Set Processors: A Survey"; Barat et al.; 2000; IEEE.*

Goldblatt, K., "The Low-Cost, Efficient Serial Configuration of Spartan FPGAs," XAPP098, Nov. 13, 1998 (Version 1.0), Xilinx.

Scott, S. et al., "The Cray T3E Network: Adaptive Routing in a High Performance 3D Torus," HOT Interconnects IV, Aug. 15-16, 1996, Stanford University.

Golestari, S.J., "A Stop-and-Go Queuring Framework for Congestion Management," Aplications, Technologies, Architectures, and Protocols for Computer Communication, Proceedings of the ACM Symposium on Communications Architectures & Protocols, 1990, ACM Press, New York, NY USA.

Dally, W. et al., "Deadlock Free Message Routing in Multiprocessor Interconnection Networks," Computer Science Department, California Institute of Technology, May 10, 1985.

Garland, D. et al., "An Introduction to Software Architecture," Advances in Software Engineering and Knowledge Engineering, 1993, vol. 1, World Scientific Company, New Jersey, USA.

Rupp et al.; U.S. Appl. No. 10/746,018, entitled "Architecture and Method for Reconfigurable Data Path Processing," filed Dec. 23, 2003.

Bechade, R.A. et al., "Programmable Arithmetic/Logic Circuits," IBM Technical Disclosure Bulletin, U.S. IBM Corp., New York, vol. 3, No. 11, Apr. 1981, pp. 4870-4873, XP-000713711.

Borgatti, Michele et al., "A Reconfigurable System featuring Dynamically Extensible Embedded Microprocessor, FPGA and Customisable I/O," 2002, IEEE Custom Integrated Circuits Conference, pp. 1-4.

Carrillo et al.; "The Effect of Reconfigurable Units in Superscalar Processors," 2001; ACM.

Dehon, Andre, "Transit Note #118 Notes on Coupling Processors with Reconfigurable Logic," M.I.T. Transit Project, Last Updated Mar. 21, 1995.

Diniz, et al., "Automatic Synthesis of Data Storage and Control Structures for FPGA-based Computing Engines," 2000, IEEE, pp. 91-100.

Gonzalez, Ricardo E., "Xtensa: A Configurable and Extensible Processor," Mar.-Apr. 2000, IEEE Micro, pp. 60-70.

Hennessy, John L. and David A. Patterson, "Computer Organization and Design: The Hardware/Software Interface," 1998, 2nd edition, Morgan Kaufmann Publishers, Inc., San Francisco, CA, p. 345.

Hwang, Kai, "Advanced Computer Architecture: Parallelism, Scalability, Programmability," 1993, McGraw Hill, pp. 182-183.

Intel and Hewlett-Packard, "IA-64 Application Instruction Set Architecture Guide," Revision 1.0, 1999, pp. C-1 through C-3.

Jacob et al; "Memory Interfacing and Instruction Specification for Reconfigurable Processors," 1999; ACM.

MIPS Technologies, Inc., "MIPS Extension for Digital Media with 3D," 1996, pp. 1-26.

Radan, Rahul and Michael D. Smith, "A High-Performance Michroarchitecture with Hardware-Programmable Functional Units," Nov. 1994, Proc. of MICRO-27, pp. 1-9.

Tanenbaum, Andrew S., "Modern Operating Systems," 2001, 2nd edition, Prentice Hall, New Jersey, p. 31.

Taylor, Michael Bedford, et al., "The Raw Microprocessor: A Computational Fabric for Software Circuits and General-Purpose Programs," Microarchitecture, IEEE Micro, Mar.-Apr. 2002, pp. 25-35.

Waingold, Elliot, et al., "Baring It All to Software: Raw Machines," Computer, Sep. 1997, IEEE, pp. 86-93.

Ye, Z.A. et al., "Chimaera: A high-performance architecture with a tightly-coupled reconfigurable functional unit," Jun. 10-14, 2000, Proc. of the 27th International Symposium on Computer Architecture, pp. 225-235.

http://www.tensilica.com/products/xtensa_overview.htm Xtensa Processor Overview.

U.S. Appl. No. 10/815,453, Ricardo E. Gonzalez, Configuring a Multi-Processor System, Mar. 31, 2004.

U.S. Appl. No. 11/021,247, Ricardo E. Gonzalez, Systems and Methods for Selecting Input/Output Configuration in an Integrated Circuit, Dec. 21, 2004.

Hauck et al., "The Chimaera Reconfigurable Functional Unit", Proceedings of the 5th Annual Symposium on FPGAs for Custom Computing Machines, Apr. 16-18, 1997, IEEE, pp. 87-96.

Lu et al., "The MorphoSys Dynamically Reconfigurable System-On-Chip", Proceedings of the First NASA/DoD Workshop on Evolvable Hardware, IEEE, Jul. 19-22, 1999, pp. 152-160.

Xilinx, "Virtex™ 2.5 V Field Programmable Gate Arrays, Product Specification," DS003-2 (v2.8.1) Dec. 9, 2002, pp. 1-20.

Michael J. Wirthlin et al., "DISC: The dynamic instruction set computer," Proceedings SPIE, Field Programmable Gate Arrays (FPGAs) for Fast Board Development and Reconfigurable Computing, Oct. 25-26, 1995, 14 pages.

* cited by examiner

SYSTEMS AND METHODS FOR SOFTWARE EXTENSIBLE MULTI-PROCESSING

CROSS-REFERENCE TO RELATED APPLICATIONS

This application claims the benefit of U.S. Provisional Application Ser. No. 60/459,538 titled "Method and Apparatus for an Array of Software Extensible Processors," filed Mar. 31, 2003, which is incorporated herein by reference.

BACKGROUND

1. Field of the Invention

The present invention relates generally to processing systems, and more particularly to methods and systems for software extensible multi-processing.

2. Description of the Prior Art

Computationally intensive applications, such as modeling nuclear weaponry, simulating pharmaceutical drug interactions, predicting weather patterns, and other scientific applications, require a large amount of processing power. General computing platforms or engines have been implemented to provide the computational power to perform those applications. Such general computer computing platforms typically include multiple single-chip processors (i.e., central processor units, or "CPUs") arranged in a variety of different configurations. The number of CPU's and the interconnection topology typically defines those general computing platforms.

To improve the functionality, reduce cost, increase speed, etc. of the general computer computing platforms, the multiprocessors and their architectures are migrating onto a system-on-a-chip ("SOC"). However, these conventional approaches to designing multiprocessor architectures are focused on either the general programming environment or on a particular application. These conventional approaches, however, cannot make many assumptions about (i.e., predict) or adapt its resources to optimize computations and communications in accordance with the user's application. This deficiency exists because the number of applications varies widely and each often has requirements that vary dynamically over time, depending on the amount of resources required. Also, those approaches that are focused on one particular application often provide high performance for only one specific application and thereby are inflexible to a user's changing needs. Further, the traditional approaches do not allow a user to optimize the amount of hardware for the user's specific application, resulting in a multiprocessor architecture with superfluous resources, among other deleterious effects.

Additionally, conventional approaches do not optimize communications among processors of a multiprocessor architecture for increased speeds and/or do not easily allow scalability of the processors of such an architecture. For example, one approach provides for "cache coherency," which allows for creation of a programming model that is relatively less resource-intensive. With cache coherency, the programming model is similar to programming a uniprocessor. However, cache coherency is expensive in terms of hardware, for example, and does not scale well as the number of nodes increases. Scaling cache coherency beyond four nodes usually requires significant hardware complexity. In contrast, another approach provides for "message passing" to obtain a more scalable solution. But this message passing typically requires the users to learn a new programming model. Furthermore, message passing machines and architectures often have additional hardware overhead as each processor element must have its own copy of the program for execution.

Some multiprocessor systems have used interface protocols, such as HyperTransport from the HyperTransport Technology Consortium of Sunnyvale, Calif., for communications between processors. Other examples of interface protocols used are Peripheral Component Interconnect (PCI) Express and RapidIO from the RapidIO Trade Association of Austin, Tex. These interface protocols have been primarily used in high-performance processing systems such as super computers, which are very expensive. The interface protocols have also been used in general purpose processing systems. In one example, one system used Hypertransport channels in an array of Advanced Micro Devices (AMD) processors from Advanced Micro Devices, Inc. of Sunnyvale, Calif. These general purpose processing systems are more expensive than embedded systems because the general purpose processing systems have to include additional functionality to run a variety of applications that may change dynamically.

SUMMARY OF THE INVENTION

The invention addresses the above problems by providing systems and methods for software extensible multi-processing. A system for processing applications includes processor nodes and links interconnecting the processor nodes. Each node includes a processing element, a software extensible device, and a communication interface. The processing element executes at least one of the applications. The software extensible device provides additional instructions to a set of standard instructions for the processing element. The communication interface communicates with other processor nodes.

In some embodiments, each one of the processor nodes is on a separate chip. In other embodiments, at least some of the processor nodes are on the same chip. The processor nodes may be configured in an array. In some embodiments, the communication interface communicates with the other processor nodes using shared memory. In other embodiments, the communication interface communicates with the other processor nodes using message passing. In some embodiments, the communication interface communicates with the other processor nodes using channels between the processor nodes. In some embodiments, at least one of the processor nodes is different from the other processor nodes.

In another embodiment, a method includes the step of executing an application in at least one processing element in a plurality of processor nodes. The method also includes the step of providing an additional instruction to a set of standard instructions for the processing element using at least one software extensible device in the plurality of the processor nodes. The method also includes the step of communicating between the processor nodes using at least one communication interface in a plurality of the processor nodes.

DETAILED DESCRIPTION OF THE INVENTION

Figure 1:
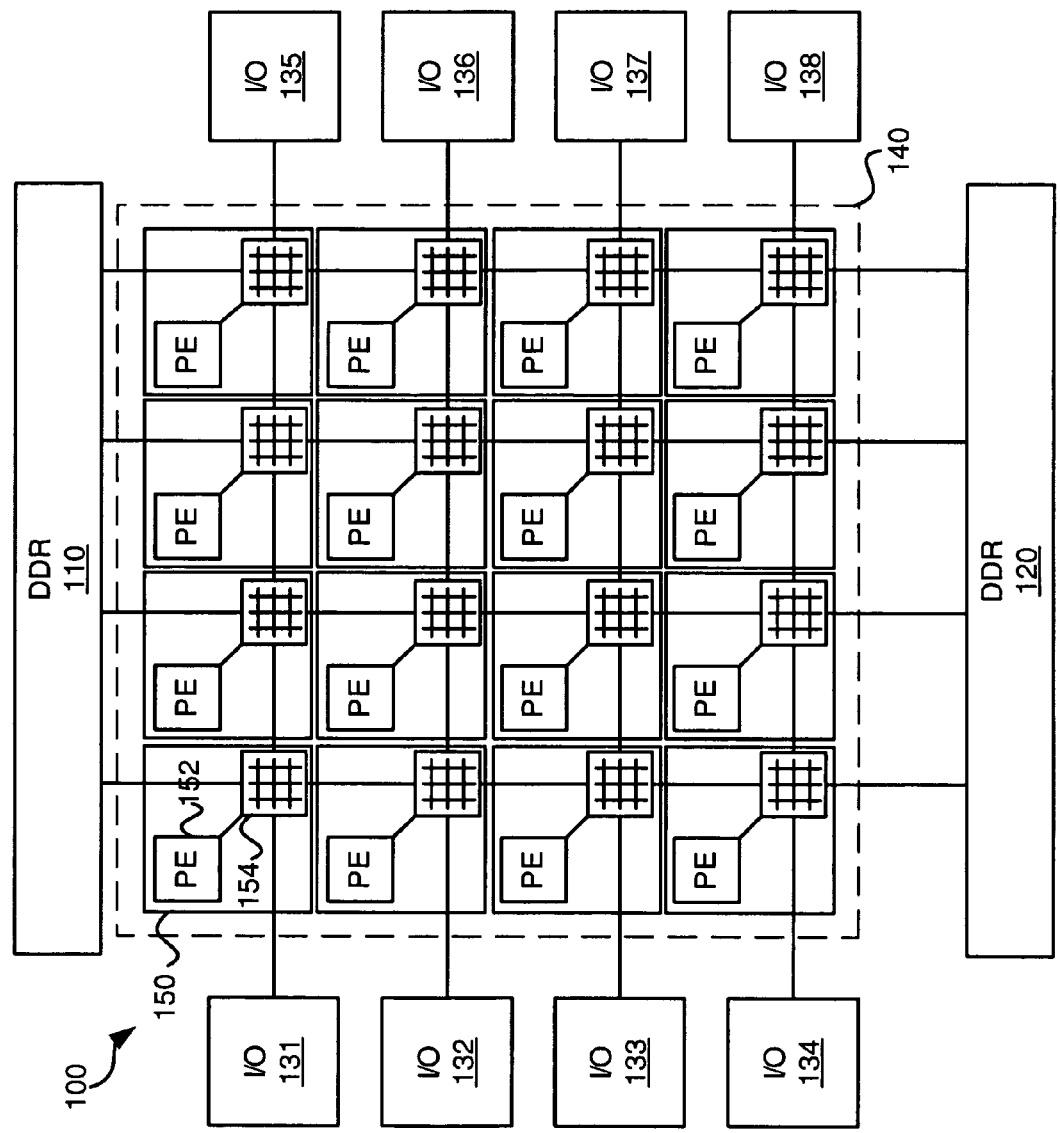
FIG. 1 is a diagram of a processing system in an exemplary implementation of the invention.

As shown in the exemplary drawings wherein like reference numerals indicate like or corresponding elements among the figures, exemplary embodiments of a system and method according to the present invention are described below in detail. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, method, process or manner.

Processing System—FIGS. 1-4

FIG. 1 depicts a diagram of a processing system 100 in an exemplary implementation of the invention. The processing system 100 includes Double Data Rate (DDR) memory controllers 110 and 120, Input/Output (I/O) devices 131-138, and an array of processor nodes 140. In this embodiment, the array of processor nodes 140 is a four by four array of processor nodes 150. Other embodiments comprise various combinations of numbers and different configurations of processor nodes to form a multiprocessor architecture. The multiprocessor architecture including such an array of processor nodes can be scaled to form a multiprocessor of any number of processor nodes, such as four by four processor nodes, or sixteen by sixteen processor nodes. In some embodiments, such scaling can be selected according to a particular manufacturing process on which the array of processing nodes 140 are suitable for operating upon.

In some embodiments, the array of processor nodes 140 is implemented as a multiprocessor system-on-a-chip, where multiple processor nodes 150 are integrated into a single chip. In some embodiments, the array of processor nodes 140 is a collection of chips on a board, where each chip comprises a processor node 150. In some embodiments, some of the processor nodes are different from each other creating a heterogeneous array of processor nodes 140.

The following description is for processor node 150 but also applies to the other processing nodes in the array of processor nodes 140. The processor node 150 comprises a processing element (PE) 152 and a processor network switch 154. The processor network switch 154 is coupled to the processing element 152. The processor network switch 154 is coupled to neighboring processor network switches in other processor nodes, the DDR memory controller 110, and the I/O device 131. A description of the processor node 150 is discussed in further detail below.

Figure 2:
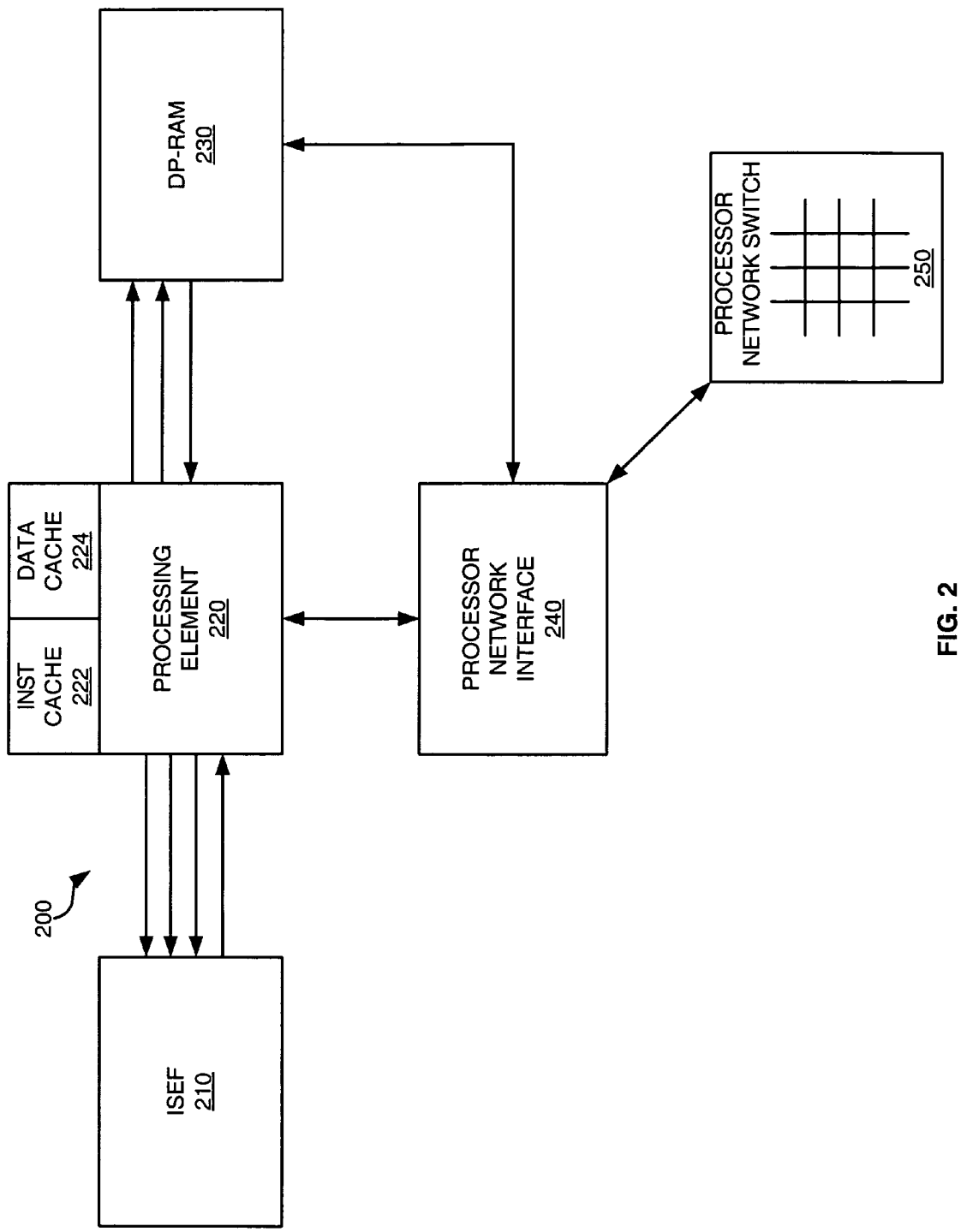
FIG. 2 is a diagram of a processor node in an exemplary implementation of the invention.

FIG. 2 depicts a diagram of a processor node 200 in an exemplary implementation of the invention. The processor node 200 includes an instruction set extension fabric (ISEF) 210, a processing element 220, an instruction (INST) cache 222, a data cache 224, a double port random access memory (DP-RAM) 230, a processor network interface 240, and a processor network switch 250.

The ISEF 210 is coupled to the processing element 220. The ISEF 210 includes programmable logic for enabling application-specific instructions ("instruction extensions") to be stored and executed. The ISEF 210 provides the ability to add additional instructions to a set of standard instructions for the processing element 220. The ISEF 210 is a type of software extensible device. In some embodiments, the ISEF 210 comprises a programmable logic device. One example of the ISEF 210 is described in U.S. application Ser. No. 10/404,706 filed on Mar. 31, 2003 and titled "Extension Adapter", which is hereby incorporated by reference.

The processing element 220 is a processor configured to execute applications. The processing element 220 includes a standard or native instruction set that provides a set of instructions that the processor element 220 is designed to recognize and execute. These standard instructions are hard-coded into the silicon and cannot be modified. One example of the processing element 220 is an Xtensa processor, from Tensilica, Inc., of Santa Clara, Calif. One example of the processing element 220 is also described in U.S. application Ser. No. 10/404,706 filed on Mar. 31, 2003 and titled "Extension Adapter."

The processing element 220 is coupled to an instruction cache 222 and a data cache 224. The instruction cache 222 is a cache configured to store instructions for execution either permanently or temporarily. The data cache 224 is a cache configured to store data either permanently or temporarily. The DP-RAM 230 is also coupled to the processing element. The DP-RAM 230 is a local memory for the processing element 220 that is configured to store data.

The processor network interface 240 is coupled to the processing element 220. The processor network interface 240 operates as a conduit between the processing element 220 and the network of the array of processor nodes 140. The processor network interface 240 is a communication interface configured to receive data from the processing element 220 and transfer the data to the processor network switch 250 for transport over the network of the array of processor nodes 140. When the processor network interface 240 receives data through the processor network switch 250 from the network of the array of processor nodes 140, the processor network interface 240 transfers the data to the processing element 220. In one embodiment, the processor network interface 240 is coupled directly to the Xtensa Processor Interface (PIF) for the processing element 220, which is an Xtensa processor. In another embodiment, the processor network interface 240 is coupled to the processing element 220 through an AMBA AHB bus. In this embodiment, the attachment to the AMBA AHB bus adds a few more cycles of latency to pass data from the processing element 220 to the processor network interface 240.

The processor network interface 240 is also coupled to the DP-RAM 230. In one embodiment, the processor network interface 240 is coupled to the DP-RAM 230 through a dedicated port on the processor network interface 240 to transfer software channel data between the processor nodes in the array of processor nodes 140.

In some embodiments, a programmer can take advantage of the data passing by the processor network interface 240 by using two methods. The first method is by using a memory mapped interface. Using a memory mapped interface, the processing element 220 generates a request to read or write a memory location. The processor network interface 240 then receives the request on the PIF or the AHB bus. The processor network interface 240 then wraps the data as a network packet and transfers the packet onto the transport layer of an OSI layer, which is implemented by the processor network switch 250. When the processor network interface 240 receives a response packet, the processor network interface 240 strips the packet control information and returns the data to the processing element 220 as a transaction on the PIF or AHB bus.

The second method of data passing is by programming using software channels. A software channel corresponds to a unidirectional stream of data flowing from source to destination. Data injected by the source is transmitted to the destination and delivered in-order. To the programmer, however, channels appear as another memory allocation interface. To send data the programmer allocates a block in memory. When the programmer is done processing the data, the programmer can simply call a subroutine (send) that automatically transmits the data to the destination. The hardware performs the data copying autonomously. This corresponds to a Direct Memory Access (DMA) that copies the data from one memory to another. In one embodiment, the DMA engine transmits the data by encapsulating it into a packet and transmitting it via the network. At the destination, the DMA engine removes the encapsulation and writes the data into the memory. The hardware ensures that no data is lost and that the source does not inject more data than the destination can process.

One advantage is that the send and receive software primitives turn access to a stream of data into a memory allocation and they can do this in constant time (i.e. the time to execute the primitive does not depend on the size of the buffer). Converting a stream into a memory buffer is a new programming paradigm.

In some embodiments, the processor network interface 240 also performs any reads or writes of the DP-RAM 230 that are posted to the AHB bus. When other devices need access to the DP-RAM 230, the processor network interface 240 provides a way to share its dedicated port to the DP-RAM 230.

The processor network interface 240 is coupled to the processor network switch 250. The processor network switch 250 is a communication interface configured to exchange data with the processor network interface 240. In some embodiments, the processor network switch 250 exchanges data with other network switches in the array of the processor nodes 140. In some embodiments, the processor network switch 250 exchanges data with other devices coupled to the array of the processor nodes 140. In some embodiments, the processor network switch 250 implements the network and link layers of the OSI model and interfaces directly with the physical link.

Figure 3:
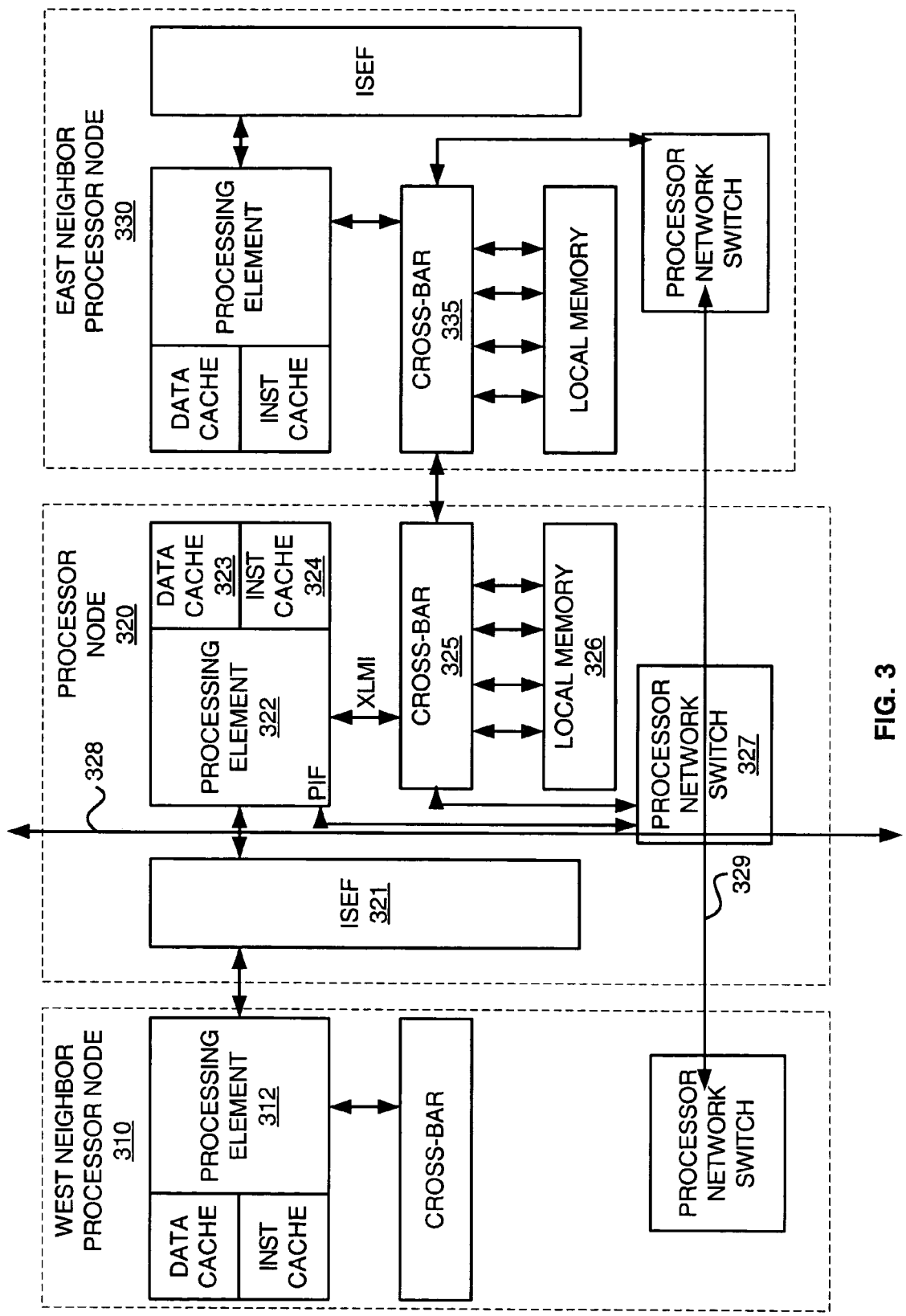
FIG. 3 is a block diagram of a processor node with neighboring processor nodes in an exemplary implementation of the invention.

FIG. 3 is a block diagram of a processor node 320 with neighboring processor nodes 310 and 330 in an exemplary implementation of the invention. In some embodiments, as a constituent component, the processor node 320 can be "tiled" or combined with other processor nodes, such as west neighbor 310 and/or east neighbor 330 to form a larger, scaled multiprocessor as an array of processor nodes 140 as described above in FIG. 1.

The processor node 320 comprises an ISEF 321, a processing element ("PE") 322, a data cache 323, an instruction cache 324, a network switch 327, a local memory 326, and optionally, a cross-bar 325. A north-south (NS) link 328 provides a communication path to the north neighbor processor node (not shown) and/or south neighbor processor node (not shown), and east-west (EW) link 329 provides a communication path to east neighbor processor node 330 and west neighbor processor node 310.

The data cache 323 and the instruction cache 324 are used, for example, to contain data and instructions, respectively, that the processing element 322 requires to perform its dedicated functionality. These local caches allow data and instructions to be readily accessible to optimize the processing performance. The ISEF 321 can be extensible and customizable such that it can be configured by way of programmable logic to implement new instructions for execution. The new instructions and the ISEF 321 are described in the technology incorporated by reference, such as those described in the U.S. patent application entitled "System and Method for Efficiently Mapping Heterogeneous Objects Onto an Array of Heterogeneous Programmable Logic Resources," U.S. application Ser. No. 10/404,680 filed Mar. 31, 2003, now U.S. Pat. No. 7,000,211, which is hereby incorporated by reference.

In operation, as the processing element 322 executes instructions from instruction cache 323, the processing element 322 can encounter a customized instruction for execution. In this instance, the processing element 322 fetches that customized instruction from the ISEF 321. For example, consider a user generates a "C" program code that yields a new instruction, "Packet Lookup," for a networking application. After compiling this instruction, for example, the compiled new instruction is programmed into the ISEF 321 for execution of this specialized instruction.

The processor network switch 327 of the processing element 322 is coupled to the NS link 328 and the EW link 329, and is configured to receive and transmit data, instructions and other information. The processor network switch 327 is coupled further to the processing element 322 for communicating data and instructions, for example, to the data cache 323 and the instruction cache 324, and via the cross-bar 325 for communicating information with the local memory 326. In sum, the processor network switch 327 allows data, instructions and other information to be communicated among an array of processing nodes along the NS link 328 and the EW link 329.

In some embodiments, in addition to communicating with the other processor nodes 310 and 330, the processor node 320 is adaptable to share resources with other processing nodes in the interest of maximizing utilization of resources. For example, the ISEF 321 is coupled to the processing element 312 of the west neighbor processor node 310. In another example, the cross-bar 325 is coupled to the cross-bar 335.

The local memory 326 can be configured to receive instructions and/or data, as well as other information that a specific processing element 322 uses to execute its portion of program instructions assigned to that element. For example, in a video compression application, a video image frame can be broken into different blocks. The processor node 320 will receive at least one unique block, such as 16×16 pixels, to process in accordance with a video compression scheme. In this instance, the 16×16 block of a current frame then will be temporally stored in local memory 326 for performing one or more compression algorithm steps. The local memory 326 can also optionally store a block of pixels from a previous and/or later video frame so as to perform any of the known video compression prediction techniques.

In some embodiments, the cross-bar 325 is used to provide access to the local memory 326 from the processor network switch 327, a neighboring processing node (e.g., east neighbor 330), and the processing element 322. In one embodiment, XLMI ("Xtensa Local Memory Interface") is the interface used to connect the local memory 326 and the processing element 322.

In one embodiment, an exemplary size of local memory 326 is 128 kB or 256 kB. In another embodiment, the cross-bar 325 is absent and the local memory 326 has a number of read/write ports for accessing each of the banks in the local memory 326. That is, at least one read/write port is reserved for interacting with either the processor network switch 327, a local memory of a neighbor processor node (e.g., east neighbor processor node 330), or the processing element 322. In yet another embodiment, the local memory 326 is designed to also be used solely as, or in combination with other functions, a scratch buffer to temporally store intermediate results.

The local memory 326 is generally adapted to obviate the functionality typically provided by L2 caches known in the art. The local memory 326 is designed to share data with other processor nodes, local memories and/or processing elements in a manner that does not require cache coherency. That is, there is no requirement that a background process ensures that each of the local memories contains the same "coherent" data. But the local memory 326 and its multiprocessor architecture, in one embodiment, are designed to share data with a level of assurance that such shared data is reliable. The local memory 326 can operate as a buffer for buffering incoming and outgoing messages in accordance with a "channel" implementation.

Figure 4:
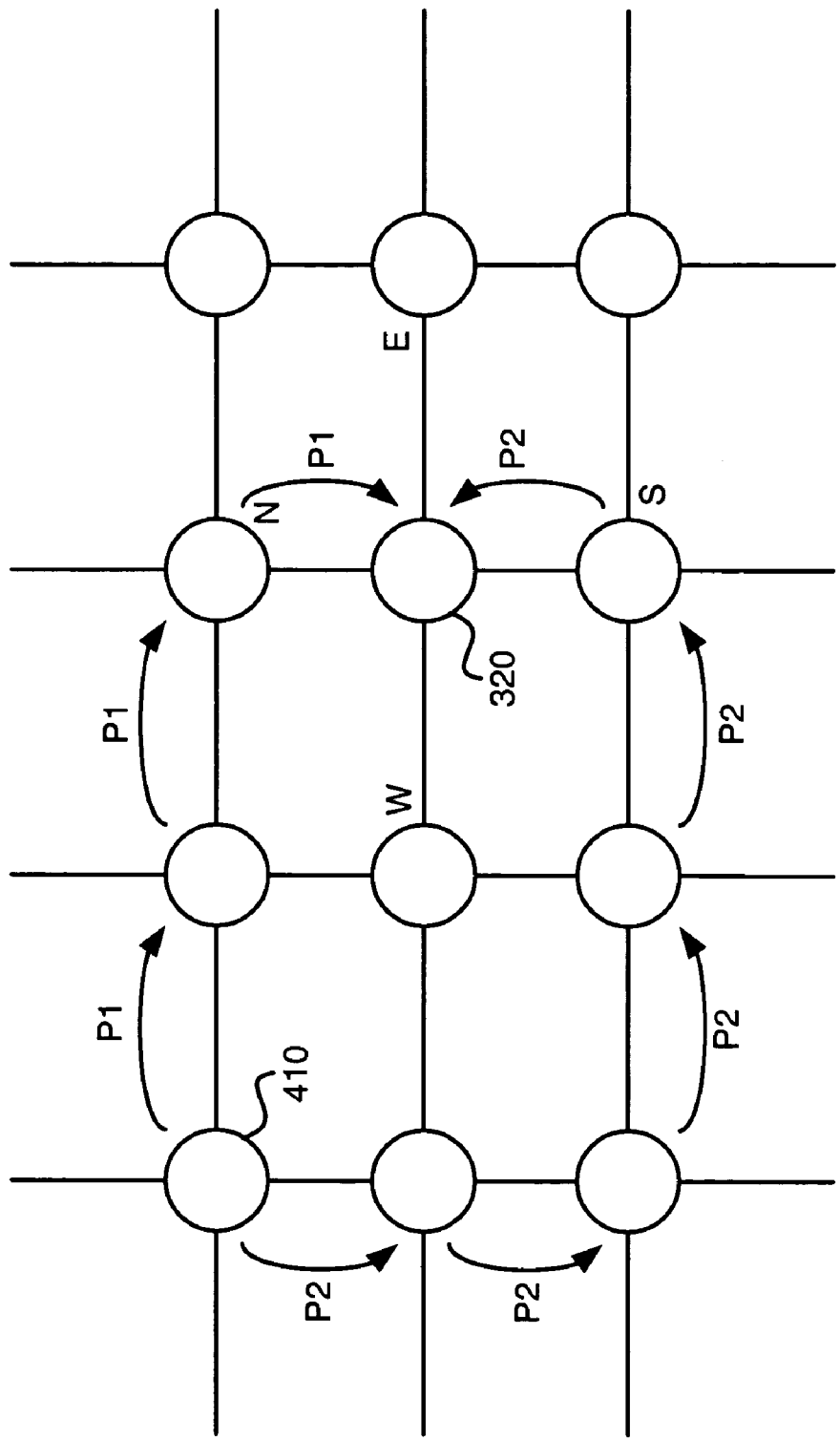
FIG. 4 is a diagram for illustrating communication paths for an array of processing nodes in an exemplary implementation of the invention.

FIG. 4 depicts a diagram for illustrating communication paths for an array of processing nodes in an exemplary implementation of the invention. The processing node 320 of FIG. 3 is shown in FIG. 4 to have a north, a south, an east and a west neighbor corresponding with a communication link or path between the processing node 320 and its neighbor. These links form a layer of an interconnection network, or a network topology, for communicating information among processor nodes of a grid. This type of arrangement helps provide high-speed neighbor-to-neighbor connections. In one embodiment, each of the communication links can transmit/receive 128 bits wide of data at 500 Mhz (i.e., 8 GB/s), for example.

Communications between a transmitting processor node 410 of FIG. 4 and the receiving processor node 320 can occur over many paths, where each path is comprised of a number of hops. FIG. 4 shows two exemplary paths, path one ("P1") and path 2 ("P2"), over which data can traverse. As shown, P1 provides for the shortest path in terms of the number of hops (i.e., 3 hops) while P2 is longer than P1 (e.g., 5 hops). In accordance with one embodiment, an exemplary multiprocessor architecture provides for adaptive routing. That is, communications between specific processor nodes may be prioritized so as to have the shortest number of hops between those processors, the least congested path, and/or any other path that facilitates optimal processing performance. Returning to the example of P1 and P2, if P1 has a longer transmit time because of congestion, for example, then path P2 can be selected to communicate information between nodes 410 and 320. It should be noted that an exemplary programming model in accordance with one embodiment, the number of hops between processing nodes that are designated to perform mission critical functions can be minimized by placing and routing those nodes as close as possible.

Information (i.e., data, instructions, etc.) is communicated by "message-passing" among arrayed processor nodes. Accordingly, each processing node is associated with a unique node identifier or address ("node ID") by using a packet switched-like network to communicate information between at least two nodes by passing messages including such information. A packet in accordance with one embodiment includes a header and a payload. The processor network switch 327, in some cases, can operate as a "router" as packets are received and either accepted into the processor node 320, or passed on to another switch of another processor node. In one embodiment, the process of message-passing runs in the background without user intervention (e.g., a user need to use these types of explicit message-passing instructions: msg( ) and/or send ( )). Furthermore, by using the exemplary message-passing process, "virtual channels" (i.e., without regard to actual number of physical hops) can be used to pass information (e.g., data) to describe to a user how sub-processes (i.e., processing elements) are interrelated.

Programming Model—FIGS. 5-8

An exemplary programming model is provided to allow expedient design of a multiprocessor architecture, where such an architecture includes one or more processor nodes. In such a model, the physical hardware is not readily apparent to the programmer, but is represented by abstractions so that a programmer's application can be embodied in a scalable architecture. The programmer can use block diagrams to represent the functionalities of the application, where these diagrams map to an array of processing nodes. In this way, the programmer can design and manufacture one or more chips having four processors or up to 256 processor nodes (i.e., a 16 by 16 grid of nodes), wherein the processors can be configured to use thread-level parallelism, including instruction-level parallelism ("ILP") with ISEF 210 and/or very long instruction set words ("VLIW"). The programmer may also partition the application and identify communications between processors.

Figure 5:
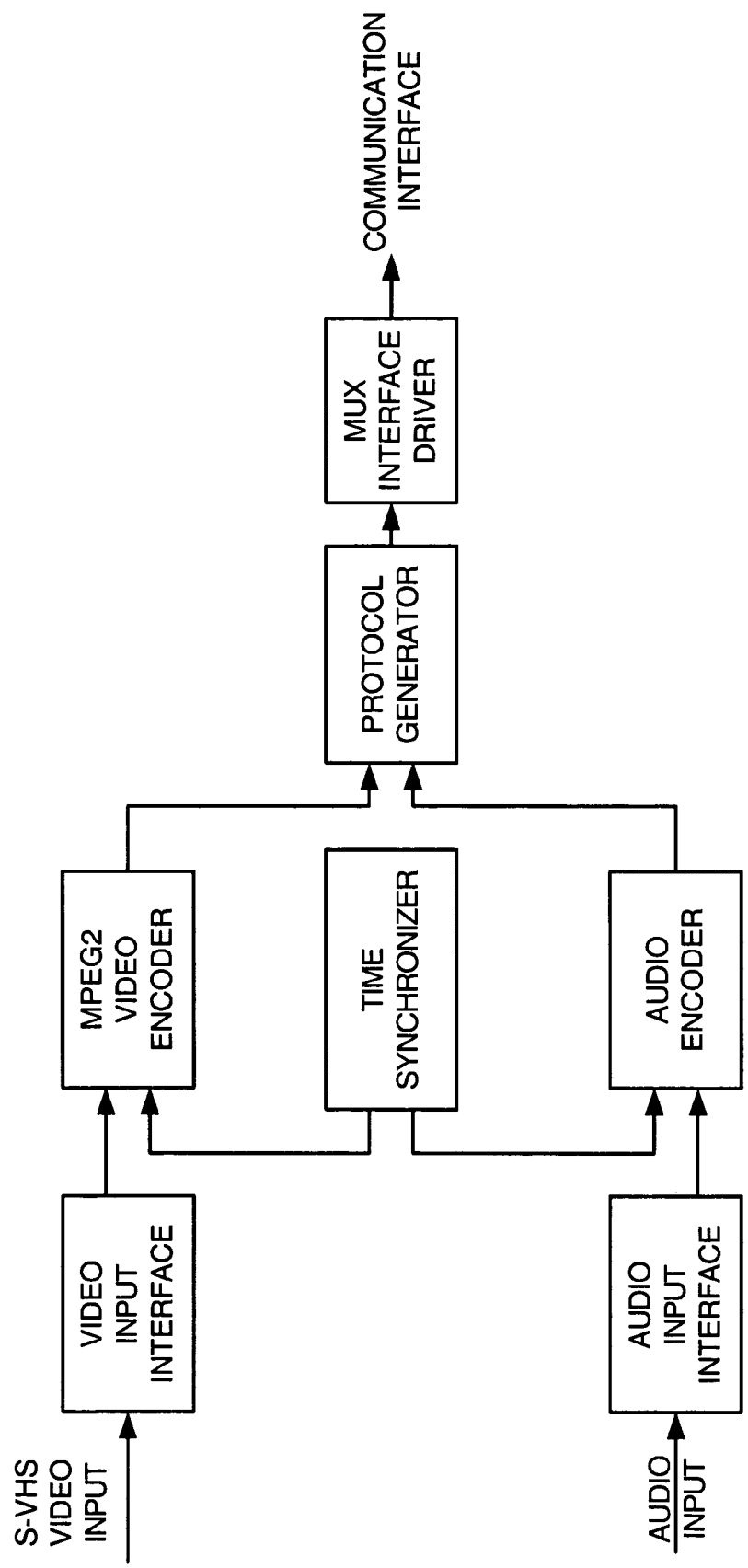
FIG. 5 is a block diagram for an application in an exemplary implementation of the invention.

FIG. 5 depicts a block diagram for embedded applications in an exemplary implementation of the invention. FIG. 5 depicts one example of applications for an embedded system that is compiled and loaded into the array of processor nodes 140 of FIG. 1. An embedded application is a computer program or set of instructions for an embedded system. Some examples of embedded applications are a video encoder and a protocol generator.

Most embedded systems are "static." One example of an embedded system is a set top box. Prior to execution, most properties for the embedded system are known ahead of time. In the set top box example, the largest image size and highest resolution are known before running the embedded applications.

For these reasons the programming model is "static." In some embodiments, at compile time, the programmer can specify how many tasks will be executing in parallel, how those tasks communicate via channels, what the memory and computation requirements are for each task, and so on. In some embodiments, the embedded application is recompiled and reloaded to change the system parameters.

In FIG. 5, the programmer may partition the blocks into smaller blocks for optimal implementation into the array of processor nodes 140. Additionally, certain blocks may be combined into a single processor node in the array of processor nodes 140.

In one embodiment, each task in a block is programmed in "C" and "Stretch-C," a programming language for software extensible instructions from Stretch, Inc. of Mountain View, Calif. The communication bandwidth is then allocated for communications between the tasks. The tasks are then placed onto an array of processor nodes 140. The channels for communications between the processor nodes are routed. The embedded applications depicted in FIG. 5 are then ready for execution.

Figure 6:
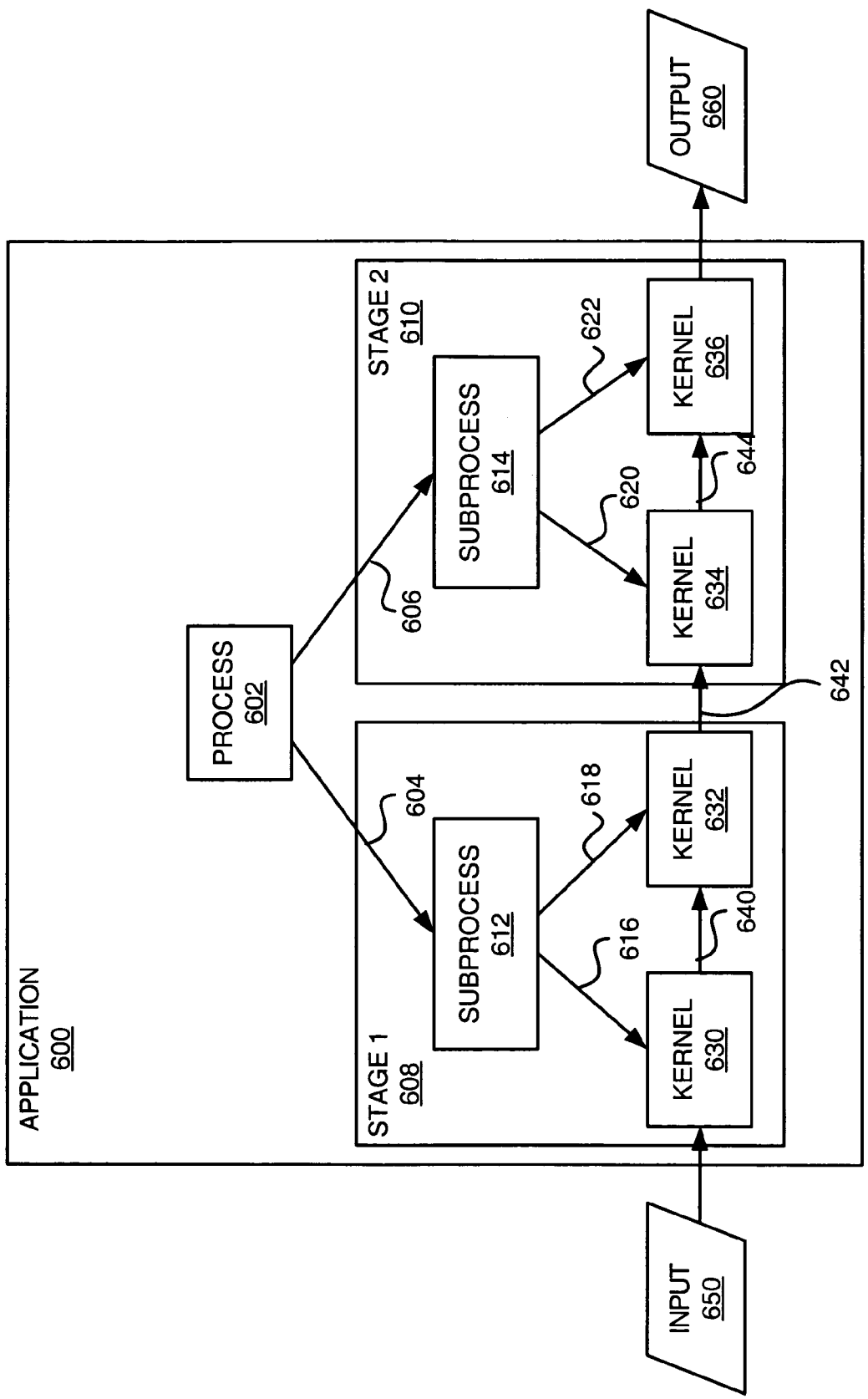
FIG. 6 is an illustration of an example of a conceptual view of an application used in an exemplary programming model of the present invention.

FIG. 6 illustrates an example of a conceptual view of an application 600 used in an exemplary programming model of the present invention. The application 600 will be described by way of an example of implementing a video compression encoder in the programming model using "C" programming, a variant thereof (e.g., C++) or any other language. The process 602 represents the overall process of encoding one or more video blocks. The process 602 includes subprocesses 612 and 614, where subprocess 612 represents a motion estimation process (or algorithm in "C") and subprocess 614 represents a variable length coding process (or algorithm in "C"). Each of these subprocesses can have any number of additional layers of subprocesses. As shown, subprocesses 612 and 614 terminate at computational kernels 630 and 632, and 634 and 636, respectively. These computational kernels represent the lowest level of abstraction that includes one or more processing nodes, as determined by the programming model, to design a configurable multiprocessor to perform the user's application.

FIG. 6 also shows parent-child relations 604, 606, 616, 618, 620 and 622 among the processes, where lower layers of subprocesses are "leaf" processes extending from the root process 602. Channels 640, 642 and 644 are also shown for channeling data into and out from the processes underlying the kernels. The channels carry the results of each processor node, which is communicated to the next computational kernel for additional processing. For example, stage 608 ("stage 1") represents, in time, the first processes. Then, the results of stage 608 are communicated to stage 610 ("stage 2") for further processing (e.g., variable length coding), which depends upon the first processes' results.

The following discusses how channels are established, after the computational kernels are done executing. The machine and/or operating system ("OS") configured to operate with the multiprocessor architecture first reserves enough buffering for that communication to succeed. In accordance with the buffering scheme, a sending or a receiving processor node need not involve the OS in the message-passing processes. The OS and/or other machine resources need only be involved in the creation of a channel (to identify, for example, specific processor nodes by node ID and to reserve buffer space), and thereafter is not needed when the code is executed in the computational kernels. Without OS interactions, communication is relatively fast.

Exemplary pseudo-code (e.g., C language) for the sending processor node and the receiving processor node is described in U.S. Provisional Application Ser. No. 60/459,538 titled "Method and Apparatus for an Array of Software Extensible Processors," filed Mar. 31, 2003. In some embodiments, channel creation takes some time relative to other multiprocessor functions because the OS is involved in establishing a channel before any other kind of resource is allocated.

In one embodiment, in creating child processes and subprocesses, the configuration of parent and child processes and communications between them are assumed to be static. In a reset sequence mode, a number of channels needed to get started is determined before execution of the processes. Each generated child process is associated with a thread ID, where the use of threads can include some aspects of UNIX®, in accordance with one embodiment. Further, before the last child process is known, the previously generated child processes are associated with execution threads by using a so-called "clone" command as described in Provisional Application Ser. No. 60/459,538 titled "Method and Apparatus for an Array of Software Extensible Processors," filed Mar. 31, 2003.

With execution threads, each of the child processes has access to the same program, data and/or variables, and thus can communicate among themselves. A parent process can update one or more data structures upon which child processes depend. After the data is updated, a flag is cleared so that child processes can be created (i.e., "wait" is set before creating children). When the wait flag is cleared to zero, the created children wake up and will start executing their code. At that point, they know whether the data structure is up to date, and they can rely on the values. Moreover, a child process might recognize that it is designated as "thread ID 3" and that it is required to communicate with "thread ID 5." These children are executing in the same address space, and see the same variables as well as program, etc. After the children begin executing with an "exec" command, the children separate from the parent (e.g., and are operating independent from the OS). After the channels have been created and the children have been separated from their parents, the parent processes can signal to the OS that placement and routing processes can proceed, because the parent-child and child-child communications have been established and are not likely to change in the future.

For many embedded applications, it is very useful to be able to guarantee the communication bandwidth between two nodes. In the case of video compression (or decompression), for example, it is useful to be able to guarantee the bandwidth required for the uncompressed video. If the machine cannot deliver the required bandwidth, the quality of the image will suffer.

In some embodiments, a user may place bandwidth requirements in the communication channels. The hardware will then guarantee that the amount of bandwidth is always available. The bandwidth is then reserved and not available for other uses.

In one embodiment, the hardware guarantees communication bandwidth by using time division multiplexing (TDM). This is similar to the bandwidth allocation used in the switched phone network but has not been applied as the communication medium for a multi-processor network. In TDM, time is first divided into "slots" (or timeslots) with N timeslots per period. During each timeslot, each link is pre-allocated to a particular connection (channel). Furthermore, the connections of each link are pre-determined to enable the connections of links across time.

Figure 7:
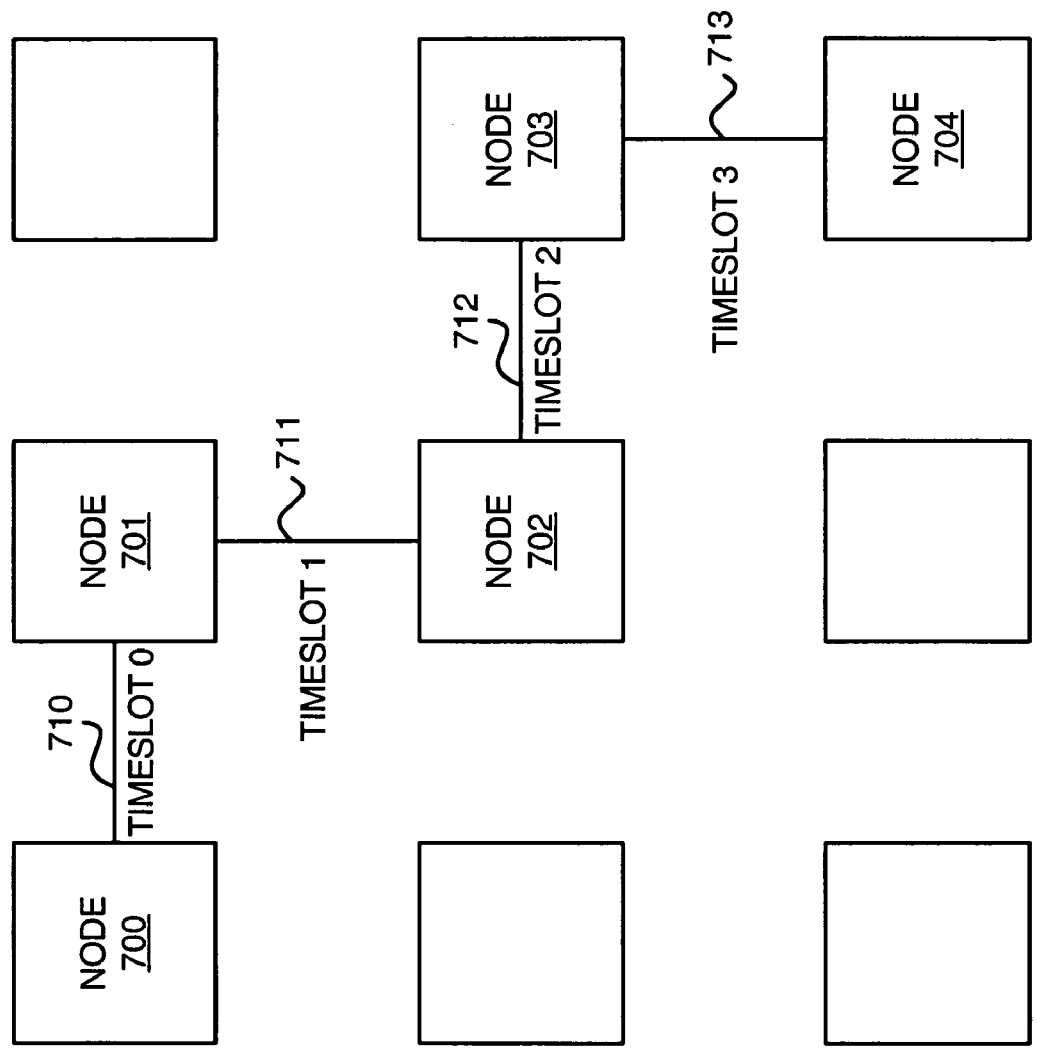
FIG. 7 is a diagram of an array of processor nodes using time division multiplexing in an exemplary implementation of the invention.

FIG. 7 depicts a diagram of an array of processor nodes using time division multiplexing in an exemplary implementation of the invention. In FIG. 7, a channel carries data from node 700 to node 704. The data first travels at timeslot 0 from node 700 to node 701 via link 710. At timeslot 1, the switch (not shown) at node 701 takes one cycle to pass the data on link 711. At timeslot 2, the link 712 then carries the data to node 703. Finally, at timeslot 3, the link 713 carries the data travels to node 704. Thus, a connection from a source node to a destination node can be built by pre-allocating link and switch bandwidth to each connection between the intervening nodes. In some embodiments where applications are static, the place and route problem is solved only once.

Routing the set of channels in an application consists of a maze router in three dimensions. Each level of the maze corresponds to a particular timeslot. Data moves vertically when it arrives at a switch and is held for a cycle. In some embodiments, no control information is routed along with the data. In these embodiments, assuming that network has been setup correctly, the data simply arrives at the destination node. This requires that all nodes be synchronized in time.

TDM can be implemented using a table with one entry per timeslot. This table indicates the connections that should be enabled in the crossbar (i.e. which egress port to use for each ingress port). A counter keeps track of the current timeslot and is used to select an entry in the table.

TDM can be thought of as virtually partitioning the bandwidth of the link into individual "virtual wires." If there are 128 timeslots in a period and 128-bits in each link, then each timeslot corresponds to a dedicated 1-bit virtual wire.

A related, alternative implementation of guaranteed bandwidth is the concept of bundling, which is also called spatial division multiplexing. Bundling is the spatial equivalent of time division multiplexing. That is, rather than allocating bandwidth by dividing time it allocates bandwidth by dividing the individual wires in the link.

If each link consists of 128 wires, the link can be divided into 128 individual "bundles." This concept is referred to as bundles because more than one wire can be used for each connection (for example, some connections could have 4 or 8 wires). Each wire is then dedicated to a particular connection and cannot be shared in time. One advantage of bundles over TDM is that global time synchronization is not required. Data will simply travel down the wire and eventually be received at the destination.

Figure 8:
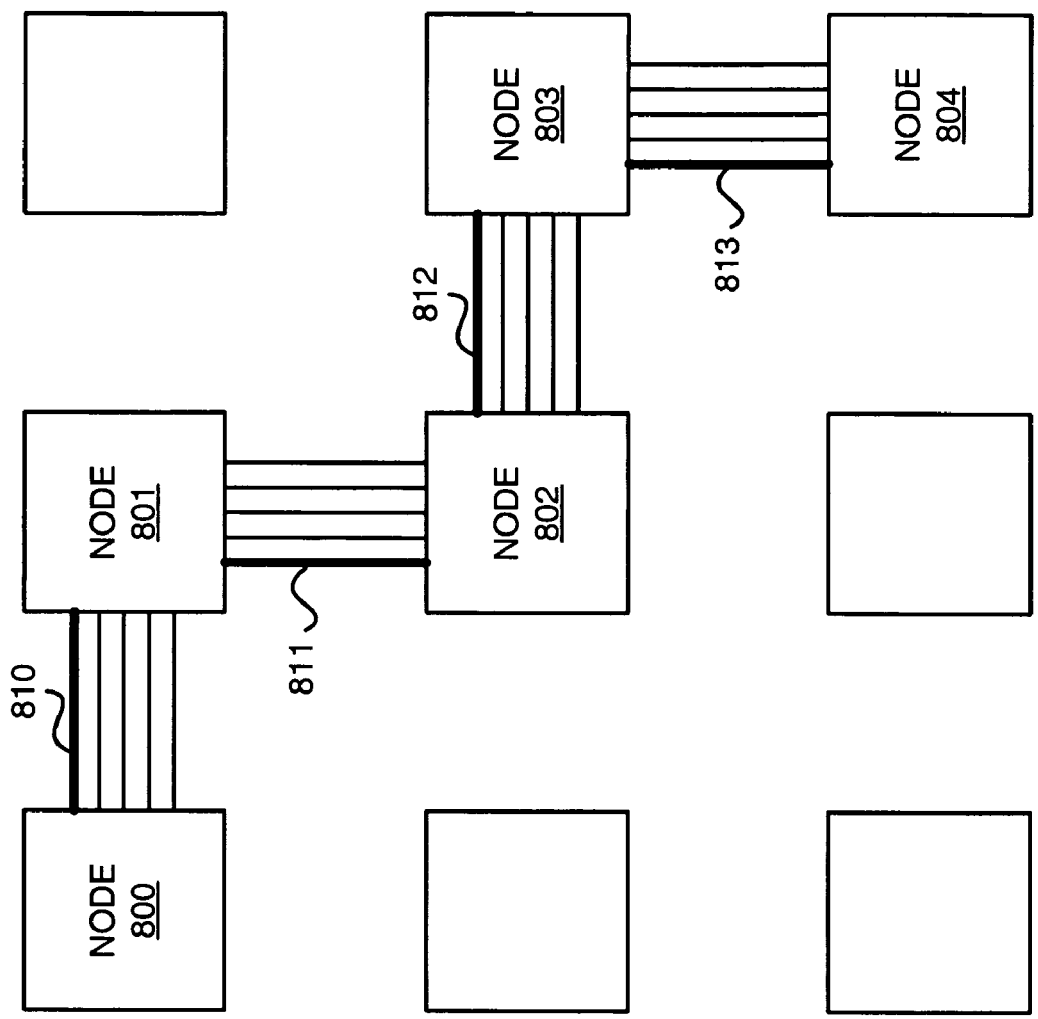
FIG. 8 is a diagram of an array of processor nodes using bundling in an exemplary implementation of the invention.

FIG. 8 depicts a diagram of an array of processor nodes using bundling in an exemplary implementation of the invention. FIG. 8 shows a simple example of an array connected by bundles (where one bundle 810-813 shown in bold is used to connect node 800 and node 804). With bundles, the complexity of the switch increases since it must be able to switch every bit individually. Furthermore, more hardware is required at the network interface to slowly insert a 64 or 128-bit quantity into a 1, 2, or 4-bit "wire." This limits how many connections can be active at once.

Figure 9:
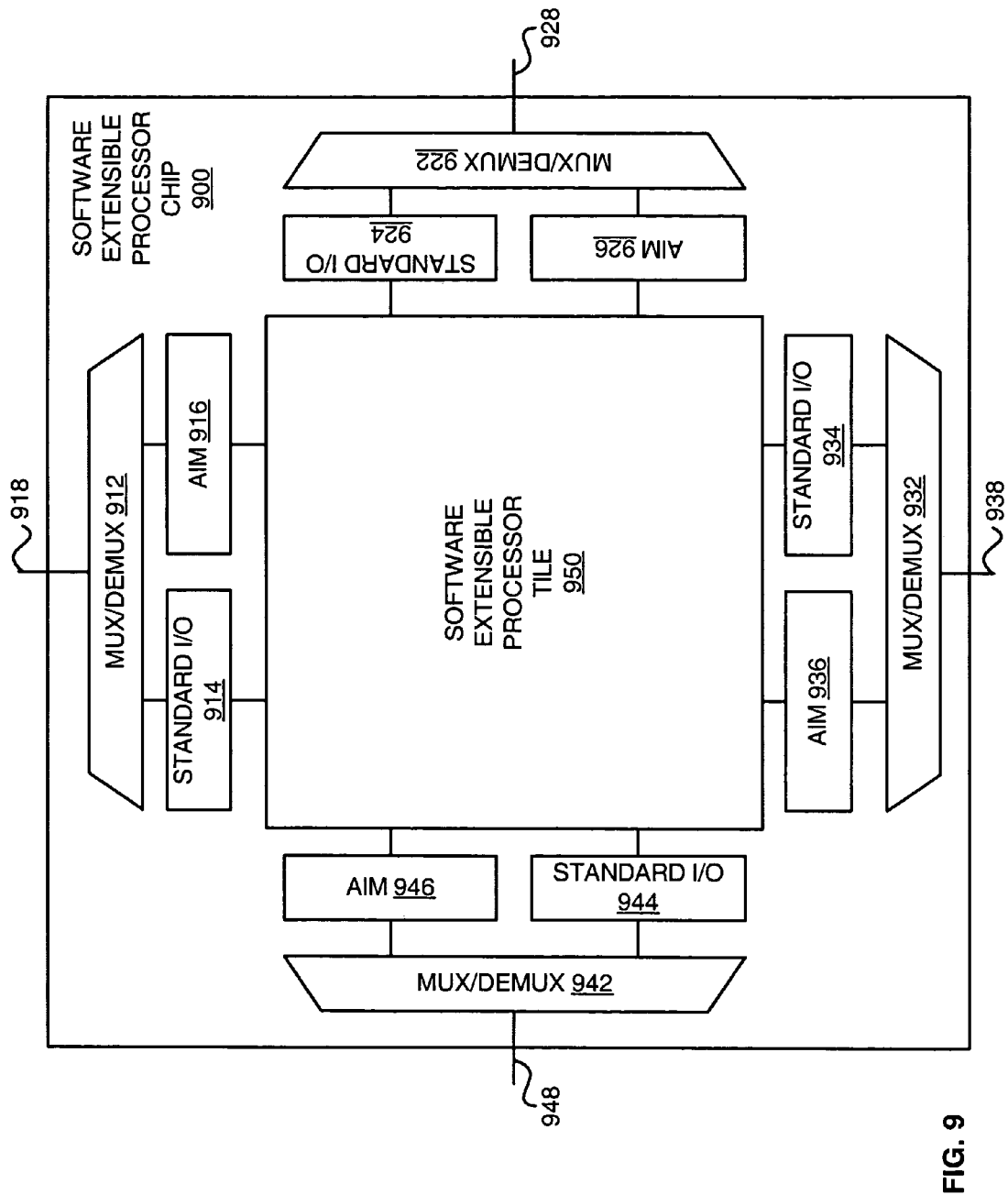
FIG. 9 is a diagram of a software extensible processor chip in an exemplary implementation of the invention.
Figure 10A:
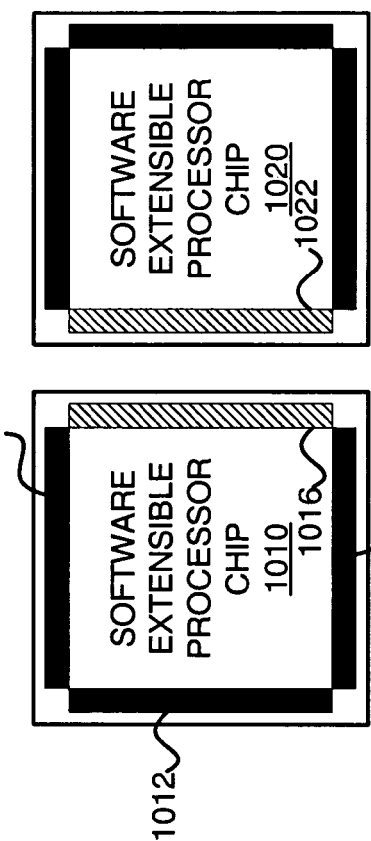
FIG. 10A is a diagram of two software extensible processor chips in an exemplary implementation of the invention.
Figure 10B:
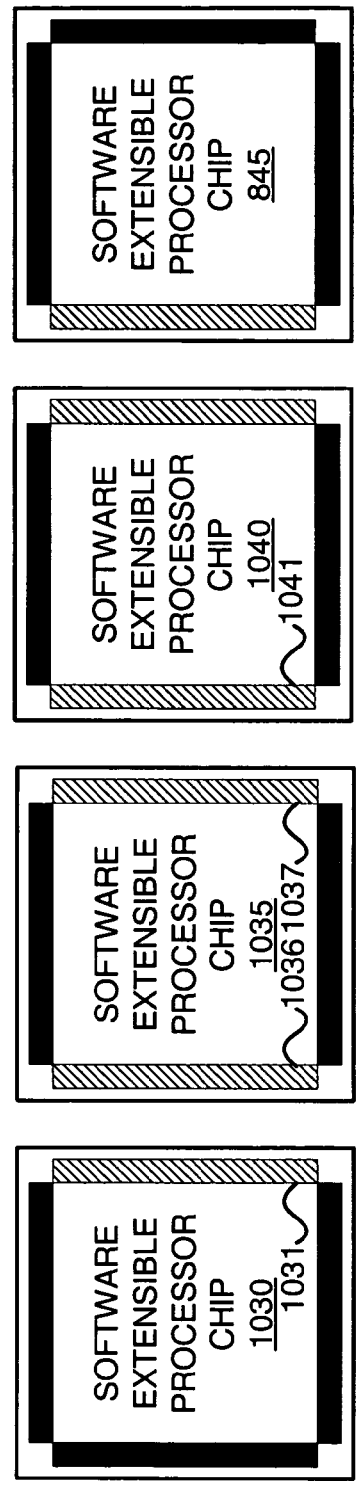
FIG. 10B is a diagram of four software extensible processor chips in an exemplary implementation of the invention.
Figure 10C:
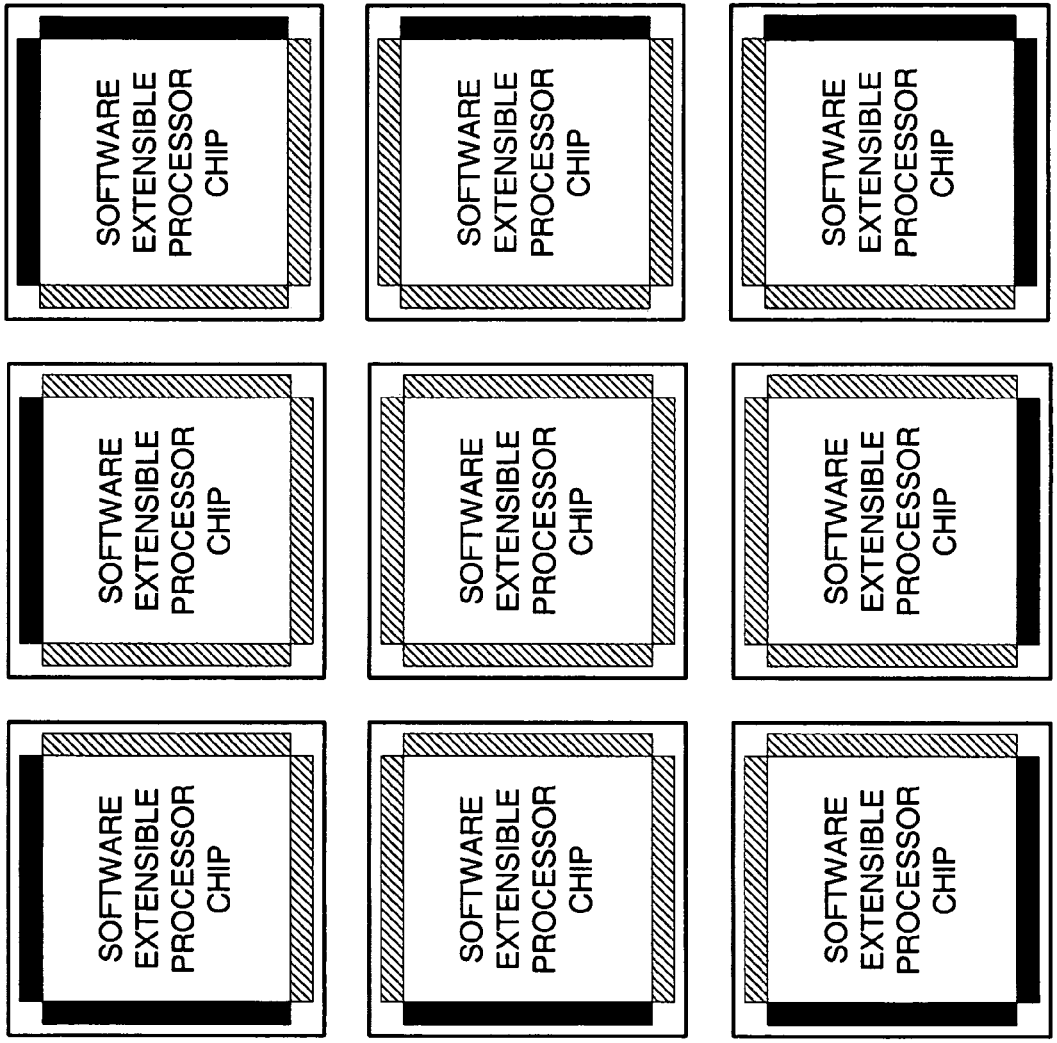
FIG. 10C is a diagram of a three by three array of software extensible processor chips in an exemplary implementation of the invention.
Figure 10D:
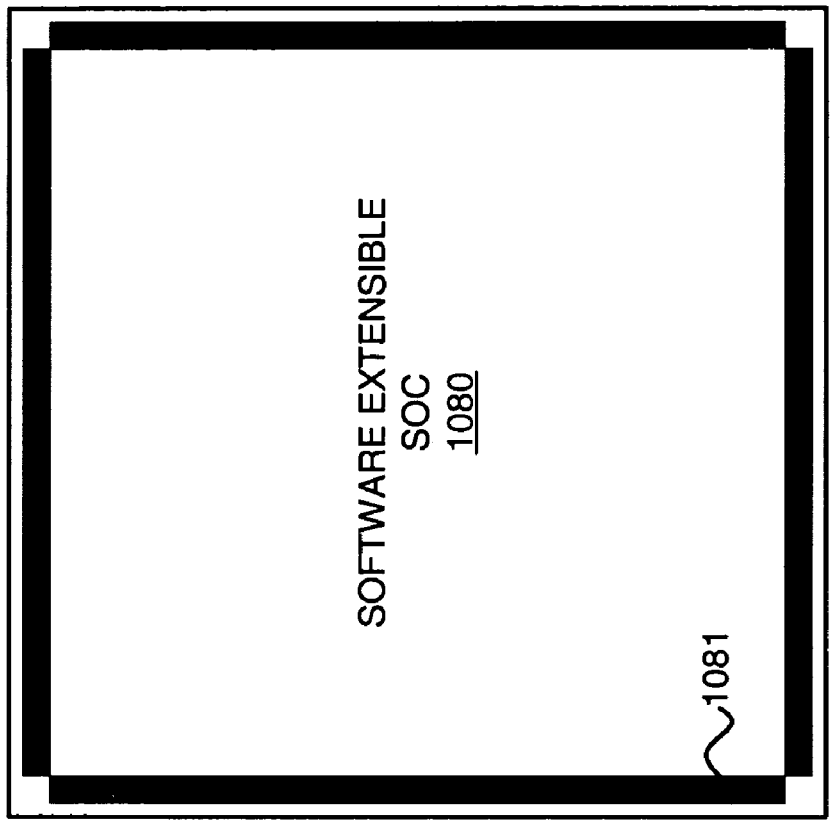
FIG. 10D is a diagram of two software extensible processor chips with a software extensible system on a chip in an exemplary implementation of the invention.
Figure 10D:
Figure 10D:
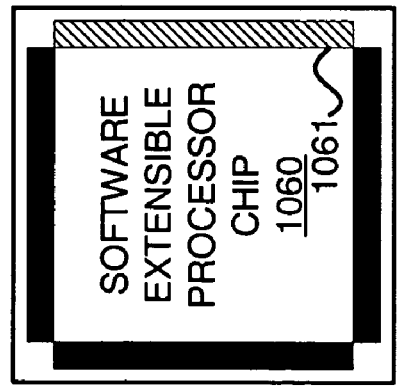

Board Level Array of Processing Nodes—FIGS. 9-10D

In some embodiments, each of the processor nodes is on a separate chip. The chips can be configured together on a board to form the array of processing nodes 140 as depicted in FIG. 1.

FIG. 9 depicts a diagram of a software extensible processor chip 900 in an exemplary implementation of the invention. The software extensible processor chip 900 includes multiplexer/demultiplexers (mux/demux) 912, 922, 932, and 942, standard I/O interfaces 914, 924, 934, and 944, array interface modules (AIM) 916, 926, 936, and 946, and a software extensible processor tile 950. The software extensible processor tile 950 is a processor node 200 as described in FIG. 2. The software extensible processor tile 950 is coupled to the standard I/O interfaces 914, 924, 934, and 944 and AIMs 916, 926, 936, and 946.

The standard I/O interface 914 is an interface configured to handle standard I/O processing between chips. Some examples of the standard I/O interfaces 914 are a peripheral component interconnect (PCI) interface, a DDR interface, and a universal asynchronous receiver/transmitter (UART) circuitry. The standard I/O interface 914 is coupled between the software extensible processor tile 950 and the mux/demux 912. The other standard I/O interfaces 924, 934, and 944 have similar operations and configurations as the standard I/O interface 914.

The AIM 916 is an interface or circuitry configured to handle a protocol for communication between software extensible processor chips 900. In some embodiments where processing nodes are on the same chip, the network switches can be coupled through wires. In other embodiments where processing nodes are on different chips, a different protocol for handling off-chip communications with other processing nodes is needed. The AIM 916 handles these off-chip communications with other software extensible processor chips to provide a physical layer to couple the software extensible processor chips together. In some embodiments, the protocol that the AIM 916 uses handles buffering between the processor chips. In some embodiments, the protocol that the AIM 916 uses accounts for latency problems for communications that go off-chip. The AIM 916 is coupled between the software extensible processor tile 950 and the mux/demux 912. The other AIMs 926, 936, and 946 have similar operations and configurations as the AIM 916.

The mux/demux 912 is configured to multiplex or demultiplex between the link 918 and the standard I/O interface 914 and the AIM 916. The mux/demux 912 is also configured to select between the standard I/O interface 914 and the AIM 916 based on the type of neighboring device that the link 918 is coupled to. For example, if the neighboring device is an I/O device, then the mux/demux 912 is configured to select the standard I/O interface 914. If the neighboring device is another software extensible processor chip, then the mux/demux 912 is configured to select the AIM 916. In some embodiments, software or an external pins determines the selection. The other mux/demuxes 922, 932, and 942 have similar operations and configurations as the mux/demux 912.

FIGS. 10A-10D illustrate different configurations for software extensible processor chips. In these embodiments, each software extensible processor chip has four interfaces for communications with a north, east, south, and west neighbor. The solid bar interfaces represent standard I/O interfaces. The hashed bar interfaces with diagonal lines indicate the AIMs. These representations of solid bars and hashed lines are merely to illustrate which interface the respective mux/demux has selected for communications with the neighboring device.

FIG. 10A depicts a diagram of two software extensible processor chips 1010 and 1020 in an exemplary implementation of the invention. The standard I/O interfaces 1012, 1014, and 1018 are depicted as solid bars. The AIM 1016 is depicted as a hashed bar. The software extensible processor chip 1010 comprises a standard I/O interface 1012 for a neighboring device to the west, a standard I/O interface 1014 for a neighboring device to the north, an AIM 1016 for a neighboring device to the west, and a standard I/O interface 1018 for a neighboring device to the south. The two software extensible processor chips 1010 and 1020 communicate with each other through the AIMs 1016 and 1022.

FIG. 10B depicts a diagram of four software extensible processor chips 1030, 1035, 1040 and 1045 in an exemplary implementation of the invention. The software extensible processor chips 1030, 1035, 1040 and 1045 are connected to each other forming a line. The software extensible processor chips 1030, 1035, 1040 and 1045 communicate with each other through their respective AIMs. For example, the software extensible processor chip 1030 communicates with the software extensible processor chip 1035 through the AIMs 1031 and 1036. The software extensible processor chip 1035 communicates with the software extensible processor chip 1040 through the AIMs 1037 and 1041.

FIG. 10C depicts a diagram of a three by three array 1050 of software extensible processor chips in an exemplary implementation of the invention.

FIG. 10D depicts a diagram of two software extensible processor chips 1060 and 1070 with a software extensible system on a chip (SOC) 1080 in an exemplary implementation of the invention. The software extensible processor chip 1060 communicates with the software extensible processor chip 1070 through the AIMs 1061 and 1071. The software extensible processor chip 1070 communicates with the software extensible SOC 1070 through the standard I/O interfaces 1072 and 1081. The software extensible SOC 1080 comprises an array of processor nodes.

Figure 11B:
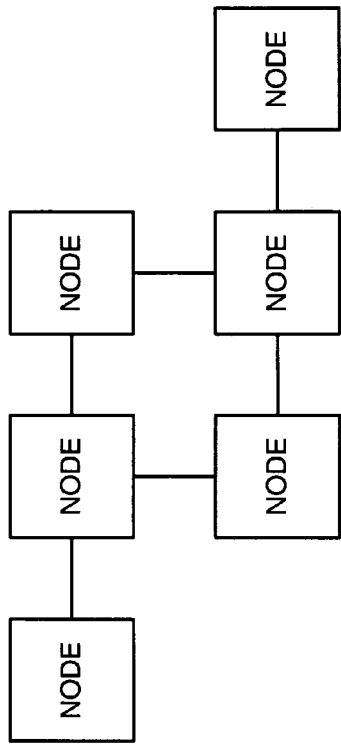
FIG. 11B is diagram of a second non-rectangular configuration of processor nodes in an exemplary implementation of the invention.
Figure 11D:
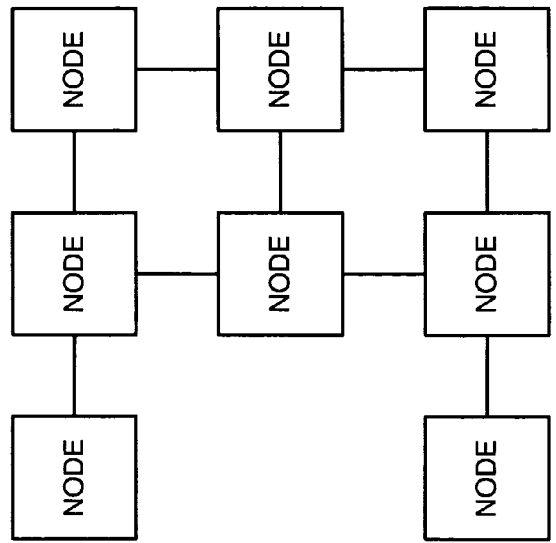
FIG. 11D is diagram of a fourth non-rectangular configuration of processor nodes in an exemplary implementation of the invention.
Figure 11A:
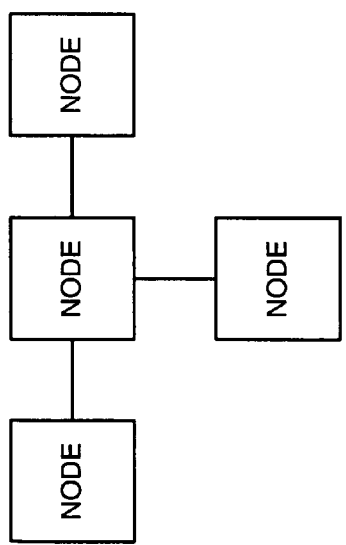
FIG. 11A is diagram of a first non-rectangular configuration of processor nodes in an exemplary implementation of the invention.
Figure 11C:
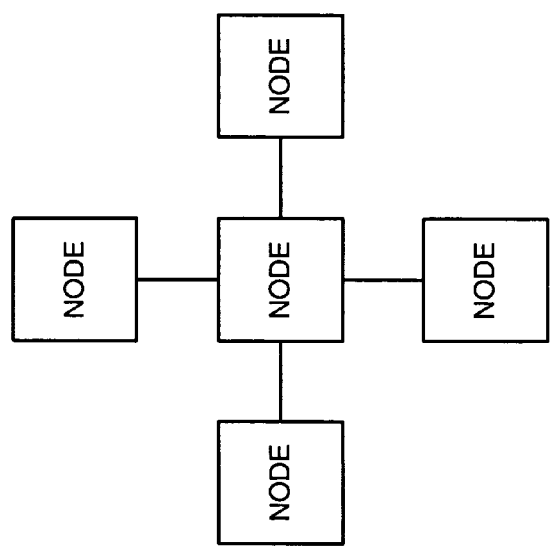
FIG. 11C is diagram of a third non-rectangular configuration of processor nodes in an exemplary implementation of the invention.
Figure 12:
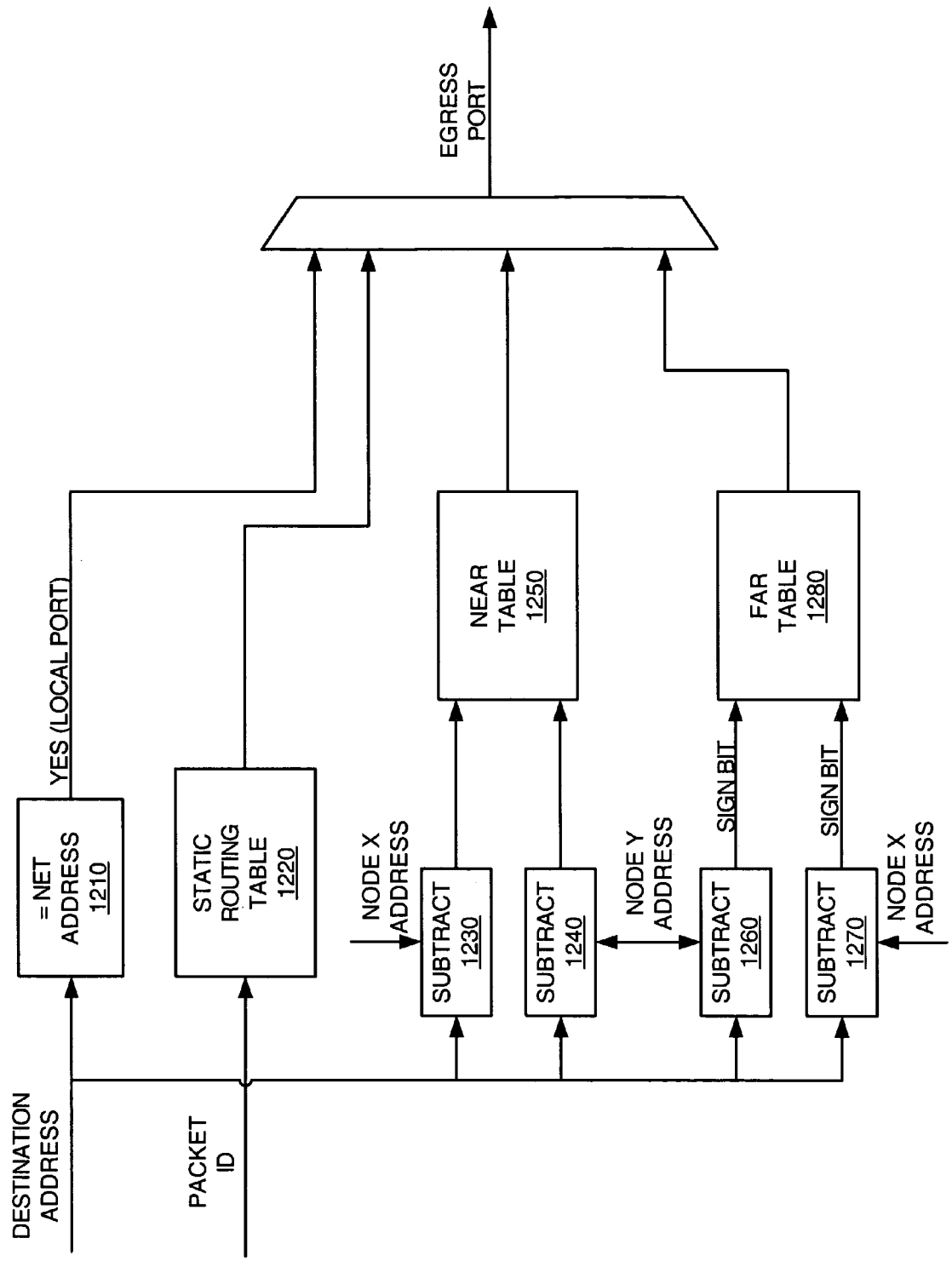
FIG. 12 is a routing algorithm in an exemplary implementation of the invention.

Routing Algorithm—FIGS. 11A-12

Microprocessor networks are usually built using regular topologies, for example, an array or a cube. Some embodiments support non-rectangular configurations. FIGS. 11A-D depict diagrams of four non-rectangular configurations in exemplary implementations of the invention.

There are two main reasons to support non-rectangular configurations. The first reason is for sharing the pins between the AIMs (used to build the array) and standard I/O interfaces (DDR, PCI, etc.). Since particular nodes may need to be attached to some standard I/O, an assumption that the nodes are placed in a regular array cannot always be made. Furthermore, the communication graph for the application usually are not rectangular and should match the configuration of processor nodes.

FIG. 12 depicts a routing algorithm in an exemplary implementation of the invention. FIG. 12 depicts the routing algorithm consisting of the following steps. In this embodiment, the steps are executed in priority order as listed. In process 1210, a comparison is made between the destination network address of the packet and the processor node's network address. If destination network address of the packet matches the processor node's network address, then the processor node is the destination for the packet and the packet is processed.

If the packet is statically routed, the packet ID is used to index into the static routing table in process 1220. In one embodiment, the ID field is 4 bits and the static routing table consists of 16 entries. Each entry has a two bit field that indicates the egress port for the packet.

In steps 1230 and 1240, the destination address is subtracted from the node address for the X and Y components, respectively. If the difference is in the range [−2, 2] (for both horizontal [x] and vertical [y] components), then the difference is used to index into a 25-entry table called the near table in process 1250. Each table entry holds a 2-bit field that indicates the egress port of the packet. The outgoing port is determined given the relative location of the destination.

In steps 1260 and 1270, the destination address is subtracted from the node address for the X and Y components, respectively. 4. In process 1280, the sign of the difference (both horizontal and vertical) is used to index into a 4 entry table called the far table that indicates the egress port of the packet.

This routing algorithm advantageously supports statically routed packets. Also, this routing algorithm supports arbitrary (i.e. non-minimal) routes with the limitation that each route can traverse each node only once. This routing algorithm supports table driven routing. In one example, the support is for up to 25-node machines. Since the routing is table driven, the algorithm can support any arbitrary topology. The routing algorithm can also support large-scale machines such as up to 256 nodes. For large machines, packet routing is broken into two steps. While still far-away from the destination, the packet is routed based on the quadrant the destination is in (i.e. upper-left, upper-right, lower-left, or lower-right). Once close to the destination, the packet is routed using the near-table entries.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed:

1. A system for processing applications, the system comprising:
   a plurality of processor nodes with each processor node comprising
      a processing element configured to execute at least one of the applications,
      a software extensible device configured to provide additional previously presented instructions to a set of standard instructions for the processing element, wherein the previously presented instructions can be programmed by software,
      a first communication interface including
         a first selector module configured to communicate with a first other member of the plurality of processor nodes or communicate with a first input/output device,
         a first array interface module configured to communicate with the first other member of the plurality of processor nodes via the first selector module,
         a first standard input/output interface configured to communicate with the first input/output device via the first selector module, the first selector module further configured to select between the first array interface module and the first standard input/output interface,
      a second communication interface including
         a second selector module configured to communicate with a second other member of the plurality of processor nodes or communicate with a second input/output device,
         a second array interface module configured to communicate with the second other member of the plurality of processor nodes via the second selector module,
         a second standard input/output interface configured to communicate with the second input/output device via the second selector module, the second selector module further configured to select between the second array interface module and the second standard input/output interface; and
   a plurality of links interconnecting the plurality of processor nodes.

2. The system of claim 1 wherein each one of the processor nodes are on separate chips.

3. The system of claim 1 wherein at least two of the processor nodes are on the same chip.

4. The system of claim 1 wherein two or more of the plurality of the processor nodes are configured in an array.

5. The system of claim 1 wherein the software extensible device comprises an instruction set extension fabric.

6. The system of claim 1 wherein the software extensible device comprises a programmable logic device.

7. The system of claim 1 wherein at least one of the first communication interface and the second communication interface is configured to communicate using message passing.

8. The system of claim 1 wherein at least one of the first communication interface and the second communication interface is configured to communicate using channels between the processor nodes.

9. The system of claim 8 wherein at least one of the first communication interface and the second communication interface is configured to perform time division multiplexing using the channels between the processor nodes.

10. The system of claim 8 wherein at least one of the first communication interface and the second communication interface is configured to perform spatial division multiplexing using the channels between the processor nodes.

11. The system of claim 1 wherein at least one of the first communication interface and the second communication interface comprises a processor network interface.

12. The system of claim 1 wherein at least one of the first communication interface and the second communication interface comprises a processor network switch.

13. The system of claim 1 wherein at least one of the first communication interface and the second communication interface comprises a standard input/output interface configured to receive the additional previously presented instructions.

14. The system of claim 1 wherein at least one of the first selector module and the second selector module comprises a multiplexer/demultiplexer.

15. A method for a system with multiple processor nodes, the method comprising:
   executing an application in at least one processing element in a plurality of the processor nodes;
   providing an additional previously presented instruction to a set of standard instructions for the processing element, using at least one software extensible device in the plurality of the processor nodes, wherein the previously presented instructions can be programmed by software;
   communicating using a communication interface including a selector module configured to communicate to a neighboring device that is a member of the plurality of processor nodes or a neighboring device that is not a member of the plurality of processor nodes, the selector module further configured to select between an array interface module and a standard input/output interface;
   determining if the neighboring device is a member of the plurality of processor nodes or is a not a member of the plurality of processor nodes;
   if the neighboring device is a member of the plurality of processor nodes, selecting the array interface module for communicating to the neighboring device via the selector module; and
   if the neighboring device is not a member of the plurality of processor nodes, selecting the standard input/output interface for communicating to the neighboring device via the selector module.

16. The method of claim 15 wherein communicating using a communication interface comprises using message passing.

17. The method of claim 15 wherein communicating using a communication interface comprises using channels between the processor nodes.

18. The method of claim 17 wherein using the channels between the processor nodes further comprises performing time division multiplexing with the channels.

19. The method of claim 17 wherein using the channels between the processor nodes further comprises performing spatial division multiplexing with the channels.

20. The method of claim 15 further comprising compiling the application.

21. The method of claim 15 further comprising loading the application into one of the plurality of the processor nodes.

22. The method of claim 15 wherein selecting the standard input/output interface for communicating to the neighboring device via the selector module comprises configuring the selector module to select the standard input/output interface for communicating to the neighboring device the selector module.

23. The system of claim 1 wherein each processor node further comprises:
   a third communication interface including
      a third selector module configured to communicate with a third other member of the plurality of processor nodes or communicate with a third input/output device,
      a third array interface module configured to communicate with a third other member of the plurality of processor nodes via the third selector module, and
      a third standard input/output interface configured to communicate with a third input/output device via the third selector module, the third selector module further configured to select between the third array interface module and the third standard input/output interface, and
   a fourth communication interface including
      a fourth selector module configured to communicate with a fourth other member of the plurality of processor nodes or communicate with a fourth input/output device,
      a fourth array interface module configured to communicate with a fourth other member of the plurality of processor nodes via the fourth selector module, and
      a fourth standard input/output interface configured to communicate with a fourth input/output device via the fourth selector module, the fourth selector module further configured to select between the fourth array interface module and the fourth standard input/output interface.

24. The system of claim 1 wherein the first communication interface is configured to communicate through the first array interface module if the first communication interface is coupled to the first other member of the plurality of processor nodes, and to communicate through the first standard input/output interface if the first communication interface is coupled to the first input/output device.

25. The system of claim 1 wherein two or more of the plurality of processor nodes are configured in a one-dimensional array.

26. The system of claim 1 wherein three or more of the plurality of the processor nodes are configured in a non-rectangular configuration.

27. The system of claim 9 wherein the time division multiplexing provides a guaranteed bandwidth for a communication between the processor nodes.

28. The system of claim 1 wherein the first communication interface is configured to guarantee a bandwidth for a communication between two of the plurality of processor nodes.

29. The method of claim 15 further comprising:
determining if another neighboring device is a member of the plurality of processor nodes;
if the another neighboring device is a member of the plurality of processor nodes, selecting a second array interface module for communicating to the another neighboring device via a second selector module; and
if the another neighboring device is not a member of the plurality of processing nodes, selecting a second standard input/output interface for communicating to the neighboring device via the second selector module.

30. The method of claim 15 wherein the communicating using the communication interface uses the array interface module and uses time division multiplexing, the time division multiplexing providing a guaranteed bandwidth for a communication to the other member of the plurality of processor nodes.

31. The method of claim 15 wherein selecting the array interface module for communicating to the neighboring device via the selector module comprises configuring the selector module to select the standard input/output interface for communicating to the neighboring device via the selector module.

32. The system of claim 15 wherein the selector module comprises a multiplexer/demultiplexer.

\* \* \* \* \*

UNITED STATES PATENT AND TRADEMARK OFFICE
CERTIFICATE OF CORRECTION

| | |
|---|---|
| PATENT NO. | : 7,581,081 B2 |
| APPLICATION NO. | : 10/750714 |
| DATED | : August 25, 2009 |
| INVENTOR(S) | : Gonzalez et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 327 days.

Signed and Sealed this

Fourteenth Day of December, 2010

David J. Kappos
*Director of the United States Patent and Trademark Office*